United States Patent
Kume et al.

(10) Patent No.: US 6,851,655 B2
(45) Date of Patent: Feb. 8, 2005

(54) SEAT RAIL SYSTEM WITH POSITION SENSOR

(75) Inventors: Shizuo Kume, Inuyama (JP); Yoshinari Onogi, Inuyama (JP)

(73) Assignee: Denki Seisakusho KK, Aichi (JP)

( * ) Notice: Subject to any disclaimer, the term of this patent is extended or adjusted under 35 U.S.C. 154(b) by 99 days.

(21) Appl. No.: 10/090,494

(22) Filed: Mar. 4, 2002

(65) Prior Publication Data

US 2002/0125396 A1 Sep. 12, 2002

(30) Foreign Application Priority Data

Mar. 5, 2001 (JP) ........................................ 2001-059743

(51) Int. Cl.$^7$ .............................................. F16M 13/00
(52) U.S. Cl. ................... 248/429; 248/424; 297/344.11
(58) Field of Search ................. 248/424, 429; 280/735; 296/207.2, 65.13, 65.14, 65.15, 68.1; 324/207.29, 429

(56) References Cited

U.S. PATENT DOCUMENTS

| | | | |
|---|---|---|---|
| 4,853,629 A | 8/1989 | Rops | 324/208 |
| 4,909,560 A | 3/1990 | Ginn | 296/65.1 |
| 5,161,820 A | 11/1992 | Vollmer | 280/730 |
| 5,330,226 A | 7/1994 | Gentry et al. | 280/735 |
| 5,413,378 A | 5/1995 | Steffens, Jr. et al. | 280/735 |
| 5,450,009 A | 9/1995 | Marakami | 324/207 |
| 5,490,069 A | 2/1996 | Gioutsos et al. | 364/424.005 |
| 5,573,269 A | 11/1996 | Gentry et al. | 280/735 |
| 5,608,317 A | 3/1997 | Hollmann | 324/207.2 |
| 5,624,132 A | 4/1997 | Blackburn et al. | 280/735 |
| 5,626,359 A | 5/1997 | Steffens, Jr. et al. | 280/735 |
| 5,652,510 A | 7/1997 | Kyodo | 324/207 |
| 5,653,462 A | 8/1997 | Breed et al. | 280/735 |
| 5,670,853 A | 9/1997 | Bauer | 318/286 |
| 5,751,129 A | 5/1998 | Vergin | 318/467 |
| 5,796,247 A | 8/1998 | Pape | 324/207 |
| 5,893,582 A | 4/1999 | Allen et al. | 280/735 |
| 5,967,549 A | 10/1999 | Allen et al. | 280/735 |
| 6,053,529 A | 4/2000 | Frusti et al. | 280/735 |
| 6,095,555 A | 8/2000 | Becker et al. | 280/735 |
| 6,113,139 A | 9/2000 | Heximer et al. | 280/735 |
| 6,275,026 B1 * | 8/2001 | Becker | 324/207.2 |
| 6,351,994 B1 * | 3/2002 | Pinkos et al. | 73/432.1 |
| 6,593,735 B2 * | 7/2003 | Becker | 324/207.26 |
| 6,612,614 B2 * | 9/2003 | Wolfe | 280/735 |

FOREIGN PATENT DOCUMENTS

| | | | |
|---|---|---|---|
| JP | H5-213142 | 8/1993 | .................... 21/22 |
| JP | 2001334907 A * | 12/2001 | ........... B60R/21/32 |
| JP | 2002200933 A * | 7/2002 | |

* cited by examiner

Primary Examiner—Gwendolyn Baxter
(74) Attorney, Agent, or Firm—Perkins Smith & Cohen LLP; Jerry Cohen; Peter J. Borghetti

(57) ABSTRACT

A seat position sensor rail device is disclosed, comprising an upper rail body to partially support a seat, a lower rail body which slidably engages the upper rail body, a position sensor device mounted on the upper rail body, and a contact plate member secured to the lower rail body. The position sensor device comprises a pivotal contact lever device having a magnet member and a magnetic field sensor device. The contact lever device gets in contact with the contact plate member, angularly displacing the magnetic field generated by the magnet member. The angular magnitude of the magnetic field is detected and the data is utilized in controlling deployment of an airbag system.

14 Claims, 14 Drawing Sheets

SEAT RAIL SYSTEM WITH POSITION SENSOR

BACKGROUND OF THE INVENTION

1. Field of the Invention

This invention generally relates to a seat rail system that mounts a vehicle seat thereon. More particularly, this invention relates to a seat rail system with a seat position sensor which detects the position of a car seat mounted thereon in relation to the car floor on which the seat rail system is secured. The positional information of the car seat can be utilized in controlling deployment of an automobile airbag system installed in association therewith.

2. Related Art

Seat belts and airbag systems are standardized equipment of automobiles today. A typical airbag system comprises an impact sensor, gas generating device and airbag with an airbag door.

As is known, indiscriminate full deployment of an airbag, regardless of an occupant's seat position, may be harmful or even dangerous to the occupant if his or her seat position is "too" close to the airbag door.

There has been proposed an airbag deployment adjustment system which detects occupants' seat positions and adjusts deployment of their airbags accordingly. This type of occupant seat position detection can be conventionally provided through utilization of a potentiometer, mechanical limit switch or magnetic field sensor.

A conventional potentiometer system is potentially influenced by change of temperature and may occasionally malfunction or generate inaccurate information. In addition, a conventional potentiometer system may not be very durable due to the abrasive mechanical contact points that the system utilizes. Such mechanical contacts will be worn over time through repeated use and may cause malfunctioning.

A conventional mechanical limit switch system is relatively less reliable as it utilizes relatively less reliable mechanical switching. For improvement of reliability, a mechanical limit switch system requires precision components or use of a hysteresis system so as to offset the inaccuracy of the mechanical elements used. A mechanical limit switch system is relatively less durable due to the abrasive mechanical contact points the system uses which will be worn over time through repeated use and may cause malfunctioning.

A seat rail device 900 utilizing a magnetic sensor system for occupant seat position detection is disclosed in U.S. Pat. No. 6,053,529.

As depicted in perspective and sectional views in FIG. 11 (prior art) attached to this specification, this seat rail device 900 includes a pair of rails 901*a* and 901*b* held in vertical engagement, each having a predetermined length. The lower rail 901*a* is generally U-shaped in section, having flanges which respectively run along the upper edges of the lower rail 901*a*. The upper rail 901*b* on which a side portion of a car seat (not shown) is to be mounted is generally rectangular in section. The upper rail 901*b* has an axial opening underneath with axial steps respectively provided along the two lower edges, where the flanges of the lower rail 901*a* are engaged in a sliding manner. The rails 901*a* and 901*b* can slide relative to each other in their axial directions and change their relative positions.

The lower rail 901*a* is provided with legs to be secured onto a car floor therewith. The lower rail 901*a* is also provided on its one side with a U-shaped magnetic sensor device 902 (a combination of a magnet and a magnetic field sensor). The upper rail 901*b* is provided on its corresponding side with an elongated hooked flange 903 having a length which is shorter than the upper rail 901*b*. The downwardly extending elongated portion of the hooked flange 903 is received within the U-shaped magnetic sensor device 902 and changes its position relative to the magnetic sensor device 902 as the upper rail 901*b* moves in its axial directions relative to the lower rail 901*a*. The relative axial movements of the upper rail 901*b* and the lower rail 901*a* affect the measurement of the magnetic field since the hooked flange 903 shields the magnetic field generated by the magnetic sensor device 902. The magnetic change is detected and its information is outputted to be processed by microcomputer. The position data outputted from the microcomputer is used to control airbag deployment of the car airbag system.

This magnetic sensor system may provide accurate and useful position information for utilization in automobile airbag deployment controlling. However, provision of accurate seat position information requires precise relative setting of the magnetic sensor device 902 and the hooked flange 903, considerably elongating manufacturing time and thus pushing up overall manufacturing costs.

Accordingly, it is an object of the present invention to provide a seat rail system which provides reliable car seat position detection.

It is another object of the present invention to provide a seat rail system which can be manufactured at a low cost.

It is another object of the present invention to provide a seat rail system which is not affected by temperature changes.

It is still another object of the present invention to provide a seat rail system which is durable.

Other objects of the present invention will become apparent from the descriptions that follow.

SUMMARY OF THE INVENTION

A seat rail system of the present invention is comprised of a pair of seat rail means that support an automobile seat thereon, one of which is a sensor rail device of the present invention. The sensor rail device comprises an elongated lower rail means to be secured to an automobile floor and an elongated upper rail means to partially mount a car seat thereon, which is slidably engaged with the lower rail means. The sensor rail device is further comprised of seat position detection means comprising contact lever means, contact plate means, magnetic field generating means and magnetic field measuring means.

The contact lever means and the contact plate means are arranged so as to move relative to each other. In an embodiment of the present invention, the contact plate means is positioned to contact the contact lever means at a predetermined forward position of the car seat and to be held in contact with the contact lever means within a predetermined distance range. In this embodiment, the contact and non-contact positions of the contact lever means and the contact plate means provide car seat position signals to be utilized in airbag deployment controlling.

When the contact lever means contacts the contact plate means as the upper rail means and the lower rail means relatively move, the contact lever means pivots from a first angular position to a second angular position, which changes the relative angular positions of the magnetic field generating means which is secured to the contact lever means and the magnetic field measuring means which is stationary, changing the magnitude of the magnetic field measured with the stationary magnetic field measuring means. In an embodiment, the magnetic field measuring means outputs electrical signals corresponding to the measurements, which are utilized in controlling the deployment of a car airbag system which is in association with the sensor rail device of the present invention.

The magnetic field generated by the magnetic field generating means is unaffected by temperature, and therefore the angular magnitude of the magnetic field is accurately detected even when the surrounding temperature is abruptly changing.

Compared with a magnetic field shielding system such as the one disclosed in U.S. Pat. No. 6,053,529, the contact lever pivoting system of the present invention provides required accurate and reliable seat position information without precision components and setting, and that at far lower costs.

DETAILED DESCRIPTION OF PREFERRED EMBODIMENT

The present invention is described in detail hereunder using several embodiments of the invention as depicted in the accompanied drawings.

Figure 1:
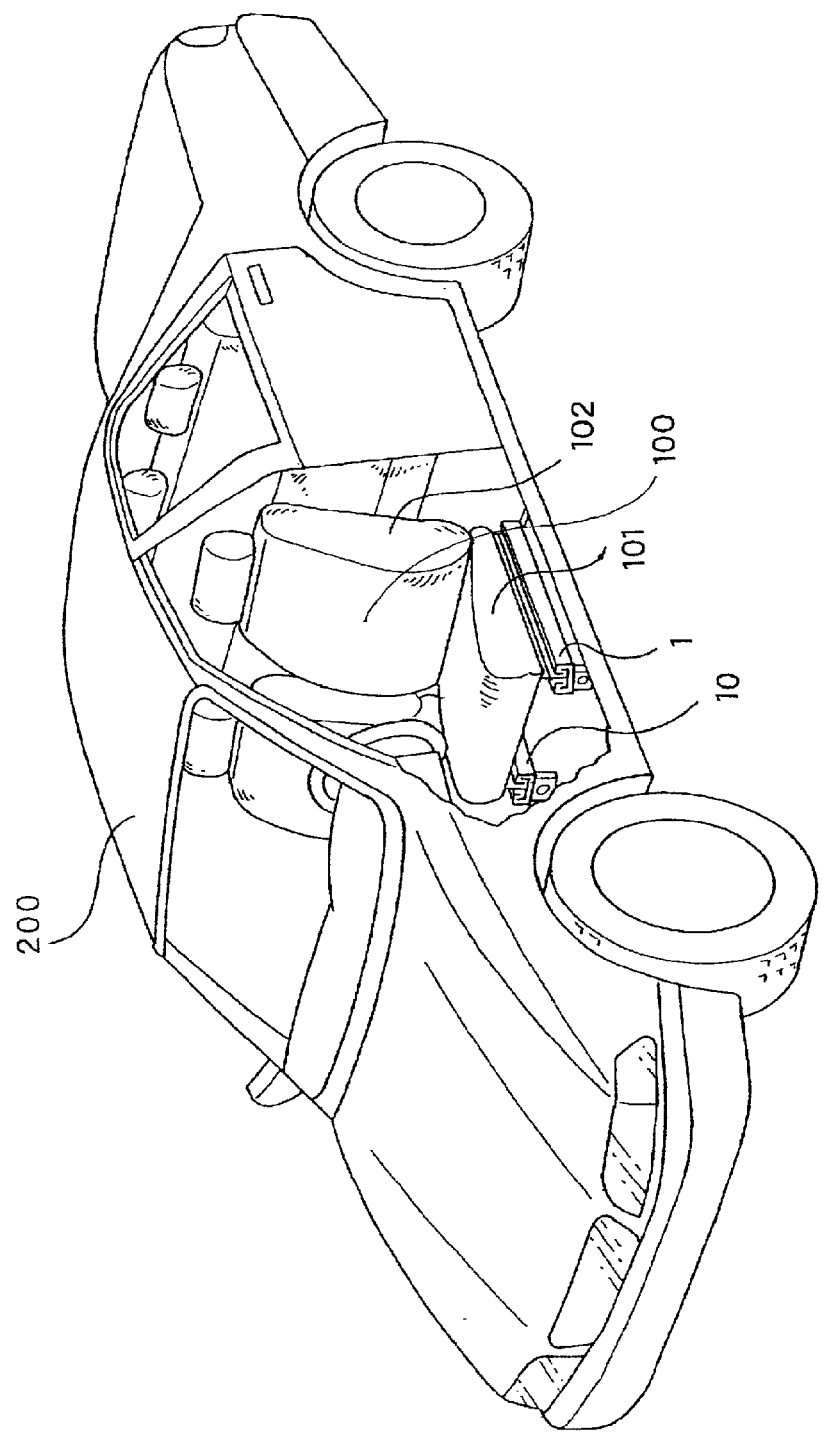
FIG. 1 is a perspective view showing general use of a seat rail system of the present invention on a car.

FIG. 1 shows how a seat rail system of the present invention is actually utilized on a vehicle or car 200 in an embodiment.

A seat rail system of the present invention includes a pair of seat rail means 1 and 10 arranged in parallel on a car floor. Typically, one of the seat rail means 1 and 10 is a sensor rail device of the present invention. For convenience sake, the seat rail means 1 will be explained hereunder as a sensor rail device 1 of the present invention.

Figure 2:
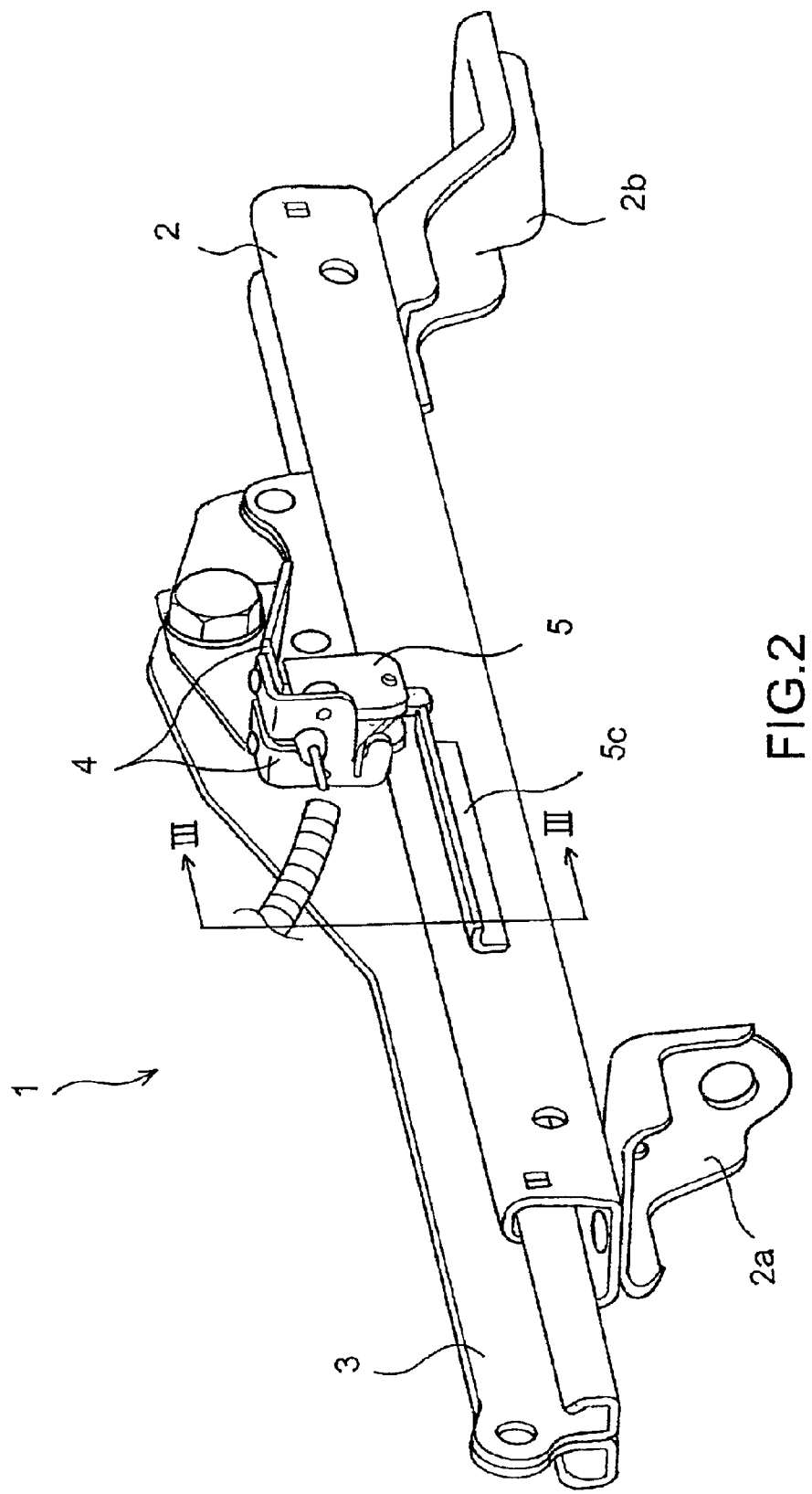
FIG. 2 is a perspective view showing a sensor rail device according to an embodiment of the present invention.

The sensor rail device 1 and the seat rail means 10 together mount thereon a car seat 100 comprising a seat cushion 101 and a seat back 102. A sensor rail device 1 according to an embodiment of the present invention is depicted in FIG. 2 in a perspective view. The front of the sensor rail device 1 is on the left and the rear of the sensor rail device 1 is on the right in this figure. The sensor rail device 1 comprises an elongated lower rail body 2 and an elongated upper rail body 3 which is slidably engaged with the stationary lower rail body 2.

The upper rail body 3 is provided with a position sensor device 5 which is securely held by a stay device 4 which is secured to the upper rail body 3 in this embodiment.

The lower rail body 2 is provided underneath with a front leg 2a and a rear leg 2b, both of which are used for securing the lower rail body 2 to the car floor by appropriate securing means such as bolts and nuts. The lower rail body 2 is further provided with a longitudinally extending step member or contact plate member 5c on its outer side in this embodiment. The contact plate member 5c is substantially shorter than the lower rail body 2 and runs in parallel with a longitudinal axis of the lower rail body 2 in this embodiment.

Figure 3:
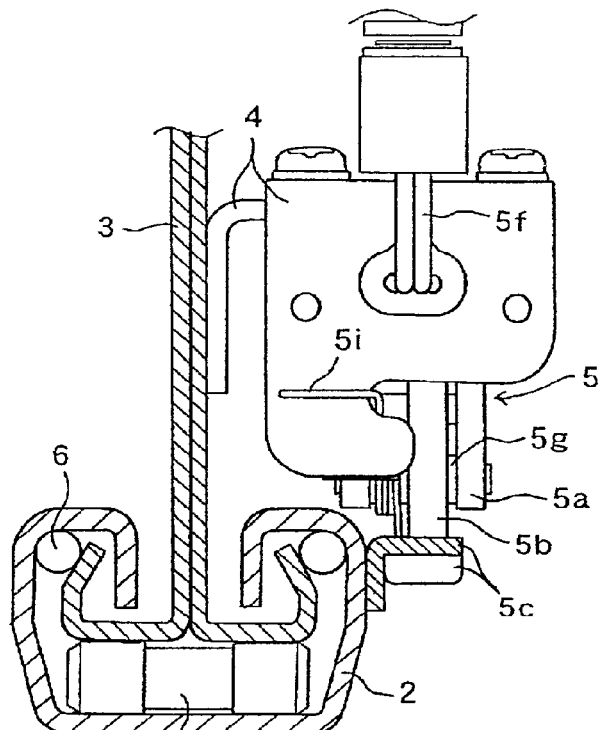
FIG. 3 is a sectional view taken along line III—III of FIG. 2.

The upper rail body 3 in this embodiment comprises a pair of plate materials which are joined firmly back to back by appropriate joining means such as welding, adhesion, or bolt means, and each lower edge of the upper rail body 3 spreads outward and then upward to provide a longitudinally extending upper hooked rail portion as shown in FIG. 3.

Each side of the lower rail body 2 is provided with a longitudinally extending lower hooked rail portion that receives a corresponding upper hooked rail portion of the upper rail body 3 in an engaged manner as shown in FIG. 3. In order to facilitate smooth relative sliding movement of the upper rail body 3 and the lower rail body 2, ball bearing means 6 and roll means 7 are provided between the upper rail body 3 and the lower rail body 2 as shown in FIG. 3.

Figure 4:
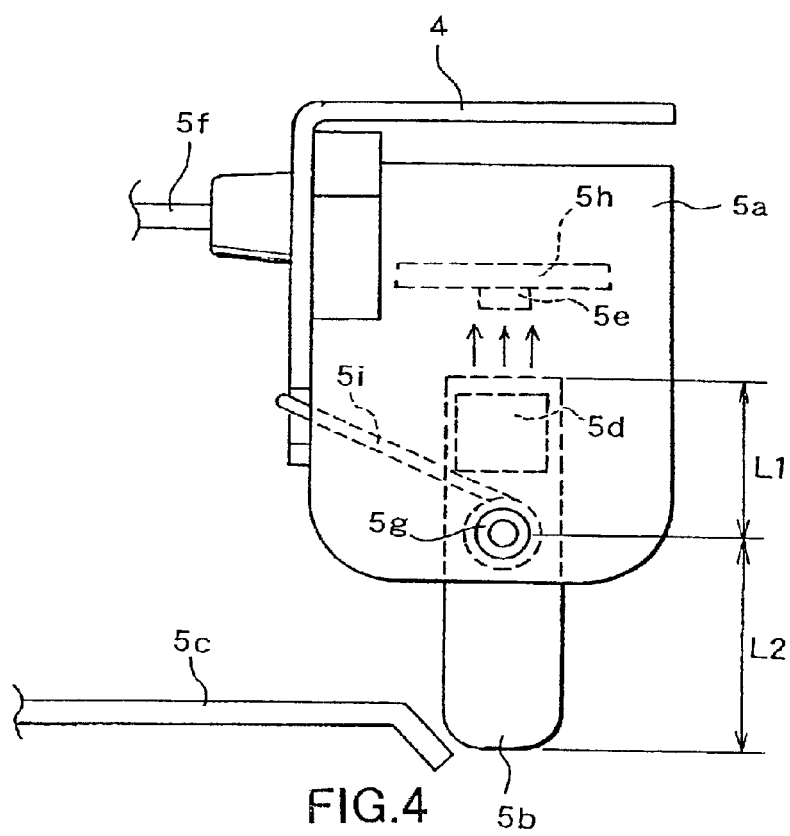
FIG. 4 is a plan view of a position detecting mechanism according to an embodiment of the present invention at its first angular position.
Figure 5:
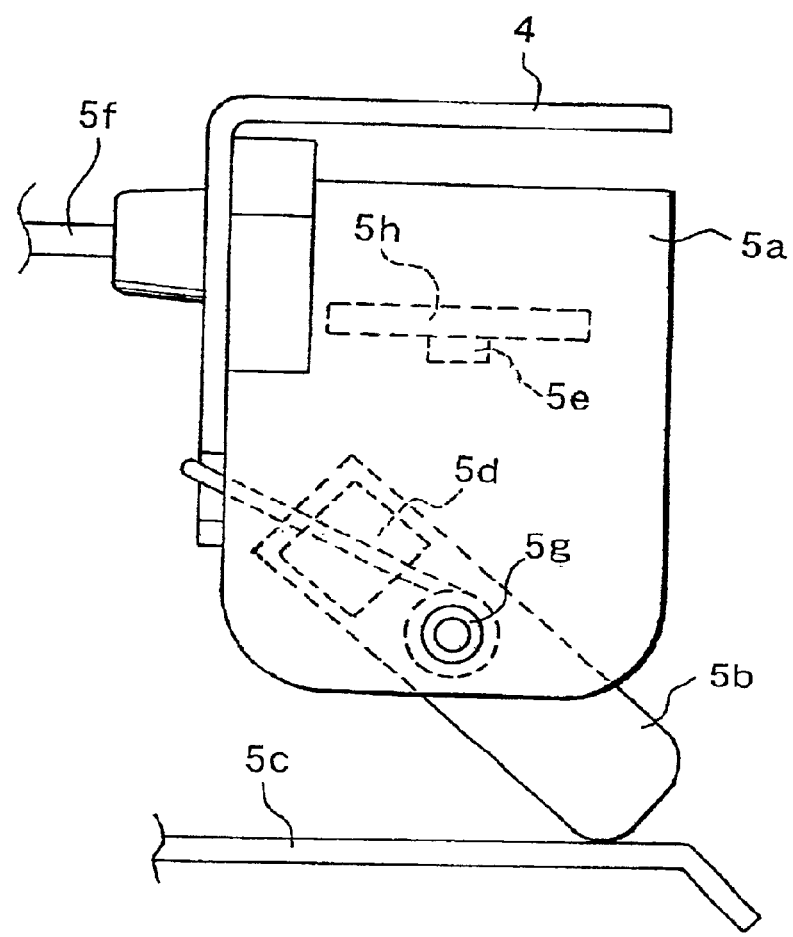
FIG. 5 is a plan view of the position detecting mechanism at its second angular position.

In this embodiment, the position sensor device 5 which detects the position of the upper rail body 3 relative to the lower rail body 2 comprises a bracket member 5a, contact lever member 5b, contact plate members 5c, magnet member 5d, Hall IC member 5e, lead members 5f, shaft member 5g, spring member 5i and IC base member 5h as shown in FIGS. 3, 4 and 5.

The bracket member 5a is secured to the upper rail body 3 with the stay device 4. The bracket member 5a houses the contact lever member 5b (partially) incorporating the magnet member 5d at an upper portion thereof, and the IC member 5e attached to the IC base member 5h, and protects the housed members from physical shocks as well as from dust. The contact lever member 5b is biased by the spring member 5i such that the contact lever member 5b is held upright during its non-contact ("ON") position.

The contact lever member 5b is mounted on the shaft member 5g and can pivot thereon relative to the IC member 5e which is stationary. The contact lever member 5b when it pivots changes the relative angular positions of the magnet member 5d provided at an upper portion of the contact lever member 5b and the IC member 5e provided on the IC base member 5h. When the contact lever member 5b contacts the rear end (which is advantageously bent aslant downward) of the contact plate member 5c which is provided on the lower rail body 2 at a forward portion thereof in this embodiment as the upper rail body 3 slides forward on the lower rail body 2 and slides on the contact plate member 5c further forward towards left in FIG. 4, the contact lever member 5b pivots to an angular position (second position) shown in FIG. 5 ("OFF" position) With the contact lever member 5b in this angular position, it will be appreciated that the IC member 5e can hardly detect the magnetic field which is generated by the magnet member 5d.

The magnet member 5d comprising a permanent magnet in an embodiment is provided at a top portion of the contact lever member 5b. The IC member 5e comprises a Hall element and amplifier in this embodiment, which is powered via the lead members 5f through the IC base member 5h. The outputted electric signals from the IC member 5e are transmitted through the base member 5e and lead members 5f to an ECU (Electric Control Unit) (not shown) in an embodiment, and after appropriate treatment at the ECU, the data is utilized in controlling the deployment of a car airbag system.

The magnet member 5d generates a magnetic field to be detected and measured by the IC member 5e. The Hall IC member 5e measures the positional magnitude of the magnetic field. When the contact lever member 5b is not in contact with the contact plate member 5c, the contact lever member 5b is in an upright position (FIG. 4) and the positional magnitude of the magnetic field is a maximum value ("ON" position). When the contact lever member 5b is in contact with the contact plate member 5c, the contact lever member 5b is in a pivoted position (FIG. 5) and the positional magnitude of the magnetic field there is very small or close to "0" ("OFF" position). Here, the "ON" position signifies a position when a car airbag system in association therewith (not shown) is ready to be deployed to the full, and the "OFF" position signifies a position when the deployment of the car airbag system is under control.

The contact conditions between the contact lever member 5b and the contact plate member 5c do not practically affect the positional measurements of the magnetic field magnitude. This system of the present invention does not require use of a hysteresis system for compensation for the fluctuations in precision of the components which may be caused in conventional systems.

The magnet member 5d may be an electromagnet in another embodiment. In such a case, the contact lever member 5b may itself be made of an electromagnet.

The contact plate member 5c of a selected length may be provided on a side of the lower rail body 2 longitudinally at a selected forward location. The location of the contact plate member 5c or the rear end portion of the contact plate member 5c is a determinative factor for the "OFF" position, which indicates that the car seat on the upper rail body 3 has reached a "dangerous" forward position. It is important to scientifically determine the exact critical point between the "ON" position and the "OFF" position through experiments. After appropriate designing, the present invention provides a very simple and reliable way to tell the "ON" and "OFF" positions.

Normally, the car seat position is held within the "ON" range. However, when a small occupant, e.g., a child, uses the seat 100, the car seat may be adjusted to a forward position within the "OFF" range. The forward car seat position in the "OFF" range is detected by the sensor rail device 1 of the present invention and the deployment of the occupant's airbag is controlled accordingly.

Figure 6:
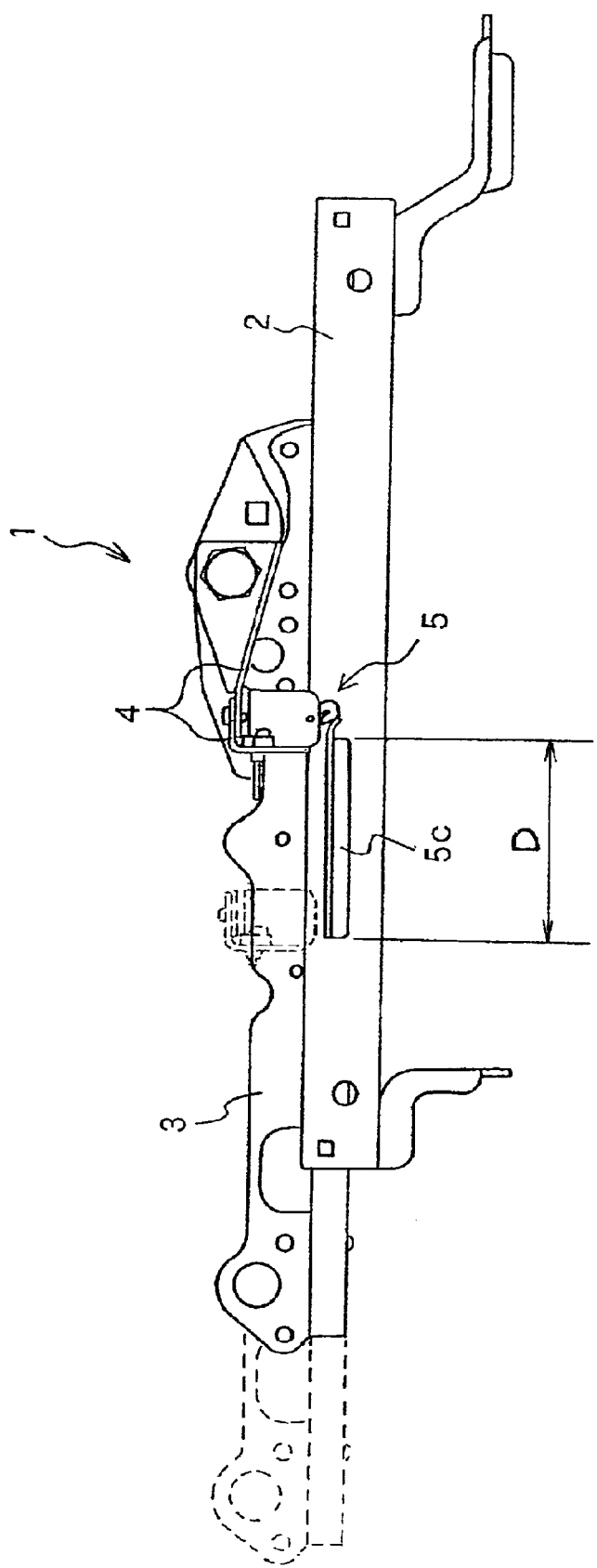
FIG. 6(a) is a side elevational view of the sensor rail device, showing the contact plate device with a contact range "D" of the seat position detecting mechanism of this embodiment.
FIG. 6(b) is side elevational view of a sensor rail device according to another embodiment of the present invention, showing another contact plate device.
FIG. 6(c) is a side elevational view of a sensor rail device according to another embodiment of the present invention, showing still another contact plate device.
Figure 6:
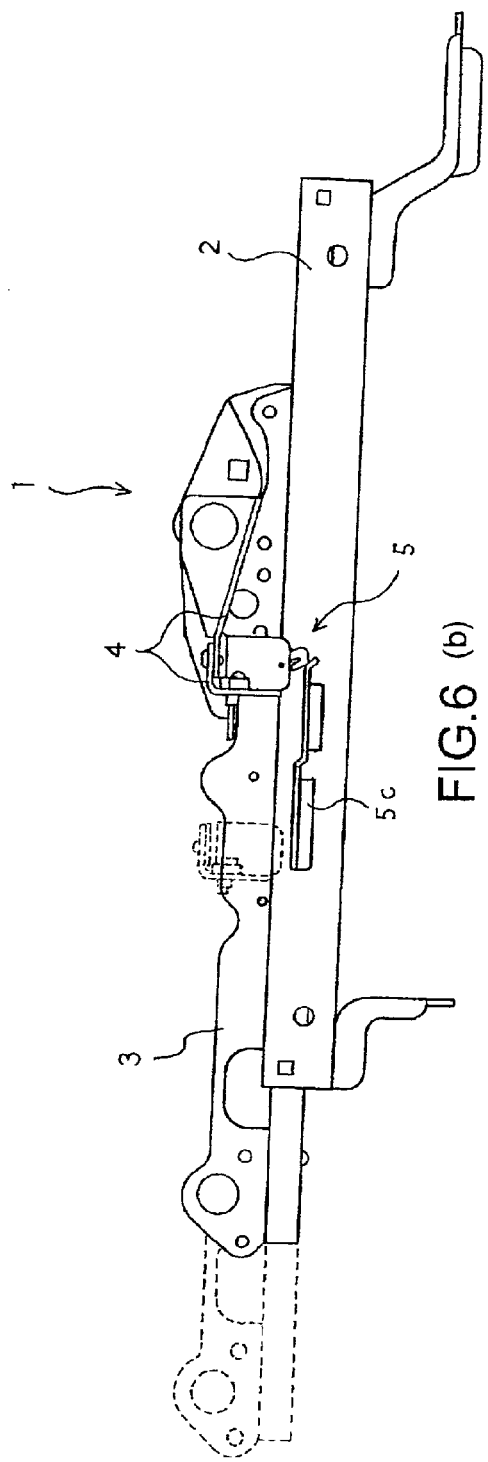
Figure 6:
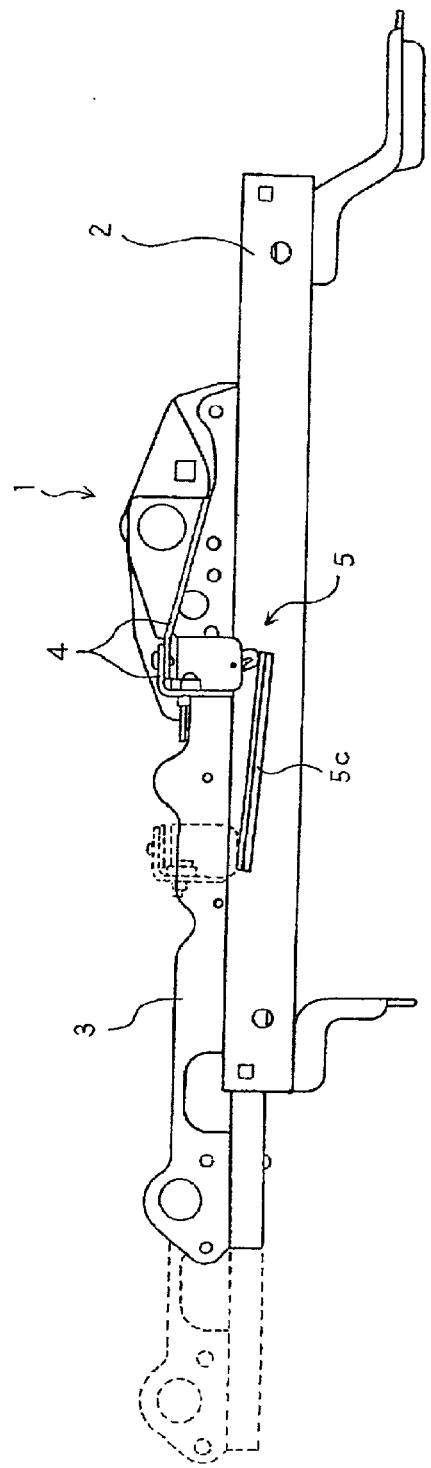

The present invention has been described to detect only the "ON" range and the "OFF" range. However, in another embodiment, a middle "Semi-OFF" range between the "ON" range and the "OFF" range can be provided. In an embodiment, such an "Semi-OFF" range is provided by displacing the contact lever member 5b to a "middle" angular position (between the upright position and the full angular position shown in FIG. 5). Such slight pivoting may be provided by providing a second step portion at a rear end of the contact plate member 5c continuously with the contact plate member 5c, slightly below the upper surface of the contact plate member 5c as shown in FIG. 6(b). In such an arrangement, the contact plate member 5c and the second step will provide a double-step configuration. In this case, three stages, "ON", "Semi-OFF" and "OFF" ranges are detectable, where detection of the "Semi-OFF" range may be used to deploy an airbag system "halfway" while detection of the "OFF" range may be used to completely hold the airbag system from functioning.

The "Semi-OFF" range and the "OFF" range may be continually or linearly provided by slanting the contact plate member 5c with its forward end provided higher than its rear end as shown in FIG. 6(c). In this arrangement, the contact lever member 5b is further angularly displaced continuously as it advances forward on the contact plate member 5c (towards left in the figure). The "Semi-OFF" range may be determined by an angular magnitude range of the magnetic field which ends where the "OFF" range starts.

FIGS. 7 to 10 show other embodiments of the contact lever device 25 and the position sensor device 5 of the present invention.

FIG. 7(a) shows a contact lever 25b2 according to an embodiment, which is to be fixedly mounted on a pivot member 25b1 comprising a shaft member 25b12 and a magnet housing 25b11 where a magnet (not shown) is mounted to provide a contact lever device 25 shown in FIG. 7(b).

Figure 7:
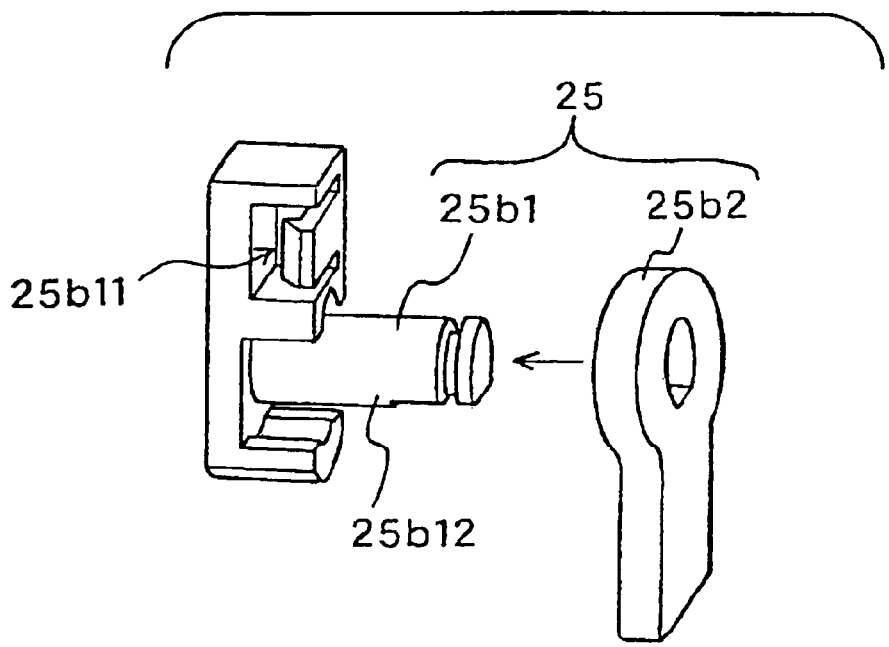
FIG. 7(a) is a perspective view showing a contact lever device before assemblage according to an embodiment of the present invention.
FIG. 7(b) is a perspective view showing the contact lever device after assemblage.
Figure 7:
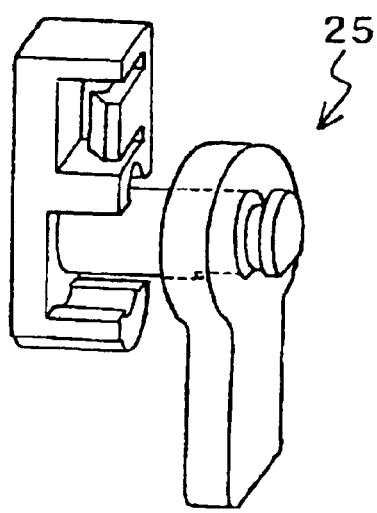
Figure 8:
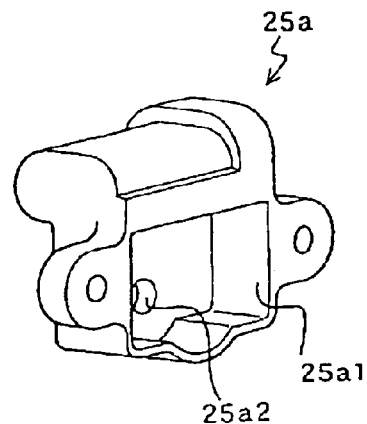
FIG. 8 is a perspective view showing a bracket device according to an embodiment of the present invention.

FIG. 8 shows the rear of a bracket member 25a according to an embodiment of the present invention, which includes an IC member (not shown) in a top housing thereof, a pivot member housing 25a1 and a shaft hole 25a2 within the pivot member housing 25a1 to receive the shaft member 25b12 of the contact lever device 25 shown in FIG. 7 therethrough.

Figure 9:
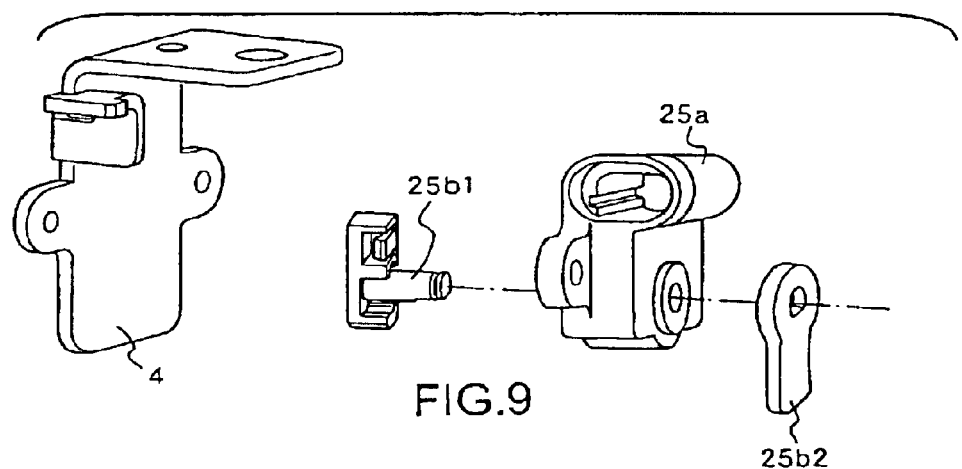
FIG. 9 is a perspective view showing another contact lever device and another bracket device with a stay device according to an embodiment of the present invention before assemblage.
Figure 10:
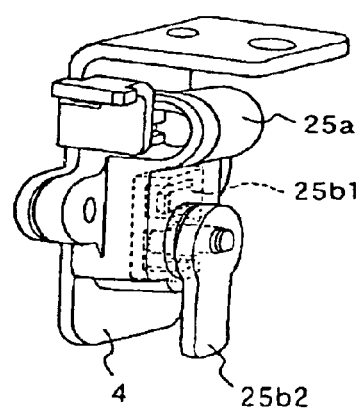
FIG. 10 is a perspective view of the assembly.
Figure 11A:
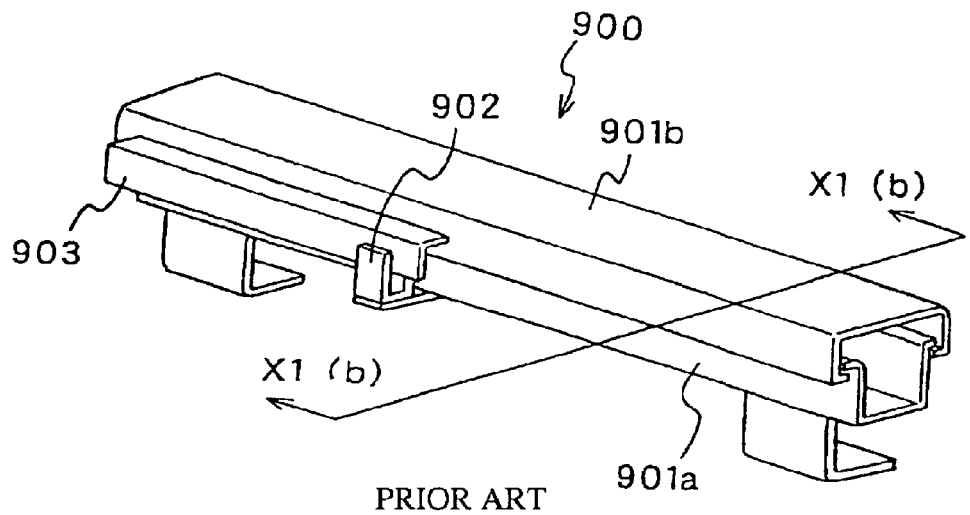
FIG. 11(a) is a perspective view of a known seat rail system.
Figure 11B:
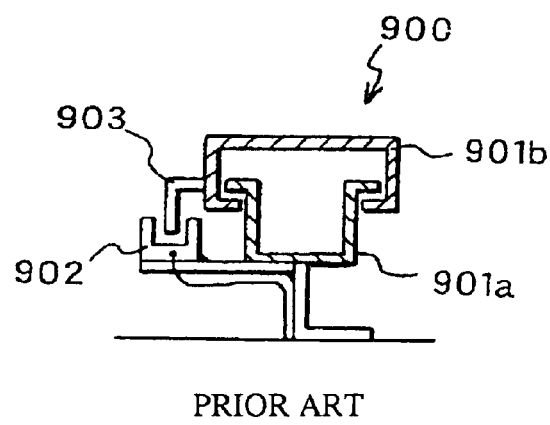
FIG. 11(b) is a sectional view of the seat rail system taken along line XI—XI of FIG. 11(a)

FIG. 9 shows how the position sensor device 25 is assembled with the bracket member 25a, the contact lever 25b2 and the pivot member 25b1. The assembled position sensor device 25 is attached to a stay device 4 as shown in FIG. 10, which is to be mounted together on the upper rail body 3 in an embodiment.

As shown in FIG. 7(a), the contact lever 25b2 has a non-circular opening in its head portion to be received in and engaged with the correspondingly shaped shaft member 25b12 as shown in FIG. 7(b). When the contact lever 25b2 pivots as described earlier, the shaft member 25b12 rotates and turns the pivot member 25b1 with a magnet (not shown) housed in the magnet housing 25b11 to an angular position from its vertical position relative to a Hall IC member or another appropriate magnetic field measuring device (not shown) housed in the bracket member 25a. Biasing means such as a spring (not shown) may be used to hold the contact lever 25b2 at its upright position when the contact lever 25b2 is not in contact with the contact plate member 25c.

The positional data obtained by the position sensor device 25 is sent to an ECU or another appropriate data processing means (not shown) to be processed and utilized in airbag deployment control.

Figure 12:
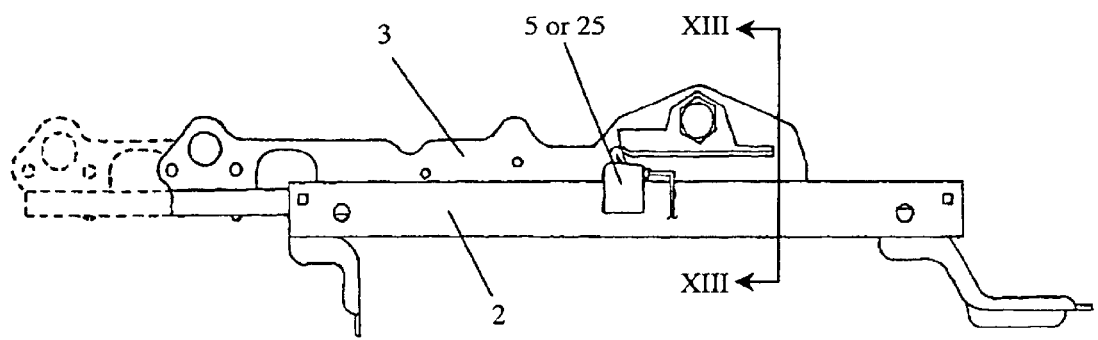
FIG. 12 is a side view of another embodiment of the present invention showing the position detection device attached to the lower rail body and the contact plate member attached to the upper rail body.
Figure 13:
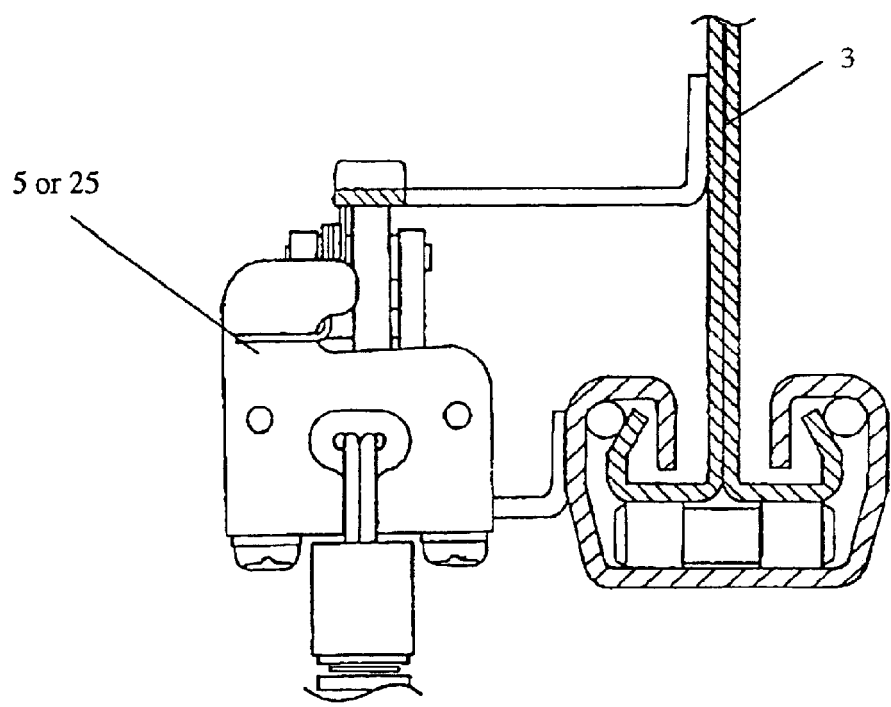
FIG. 13 is a sectional view taken along line XIII—XIII of FIG. 12.

In another embodiment of the present invention, the position sensor device 5 or 25 is attached to the lower rail body 2 instead of the upper rail body 3, and the contact plate member 5c is provided on the upper rail body 3 instead of the lower rail body 2. This arrangement illustrated in FIGS. 12 and 13 works practically identically with the arrangement set forth in FIGS. 2 and 3.

Figure 14:
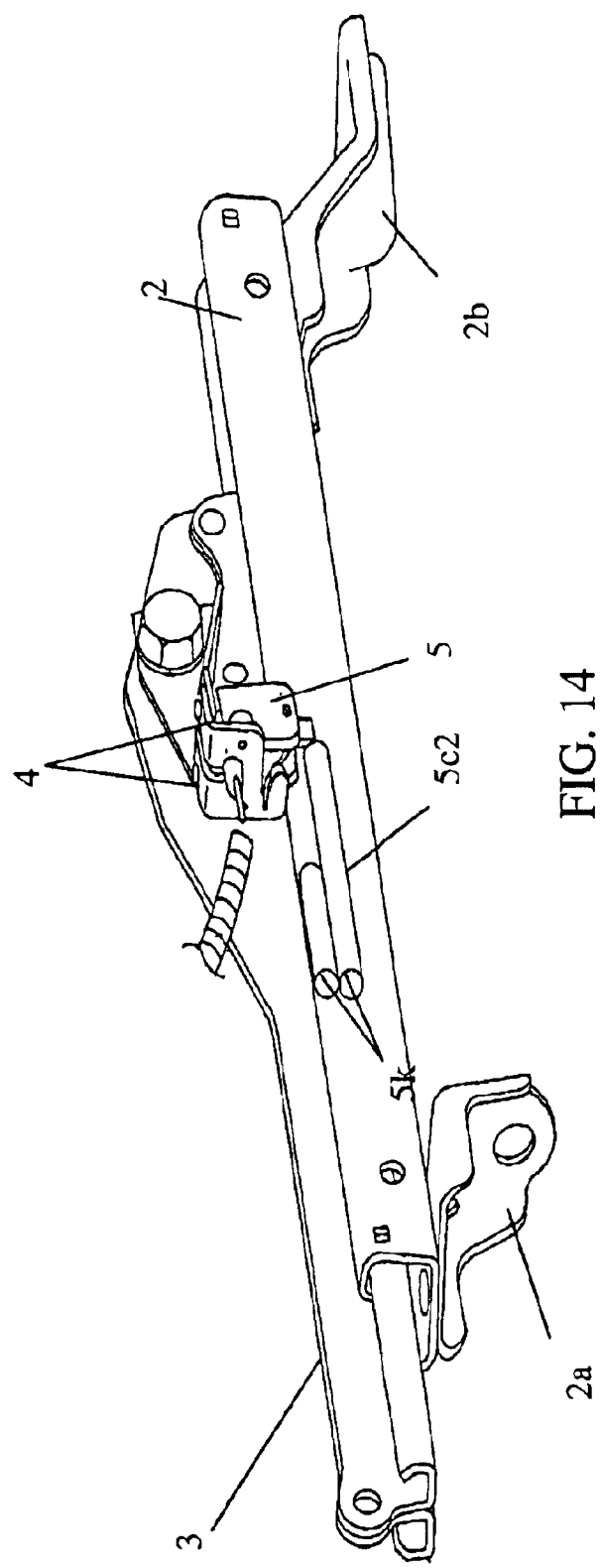
FIG. 14 is a side elevational view of an alternative embodiment of the sensor rail device illustrating a double pin contact plate member 5c in its "OFF" position.
Figure 15:
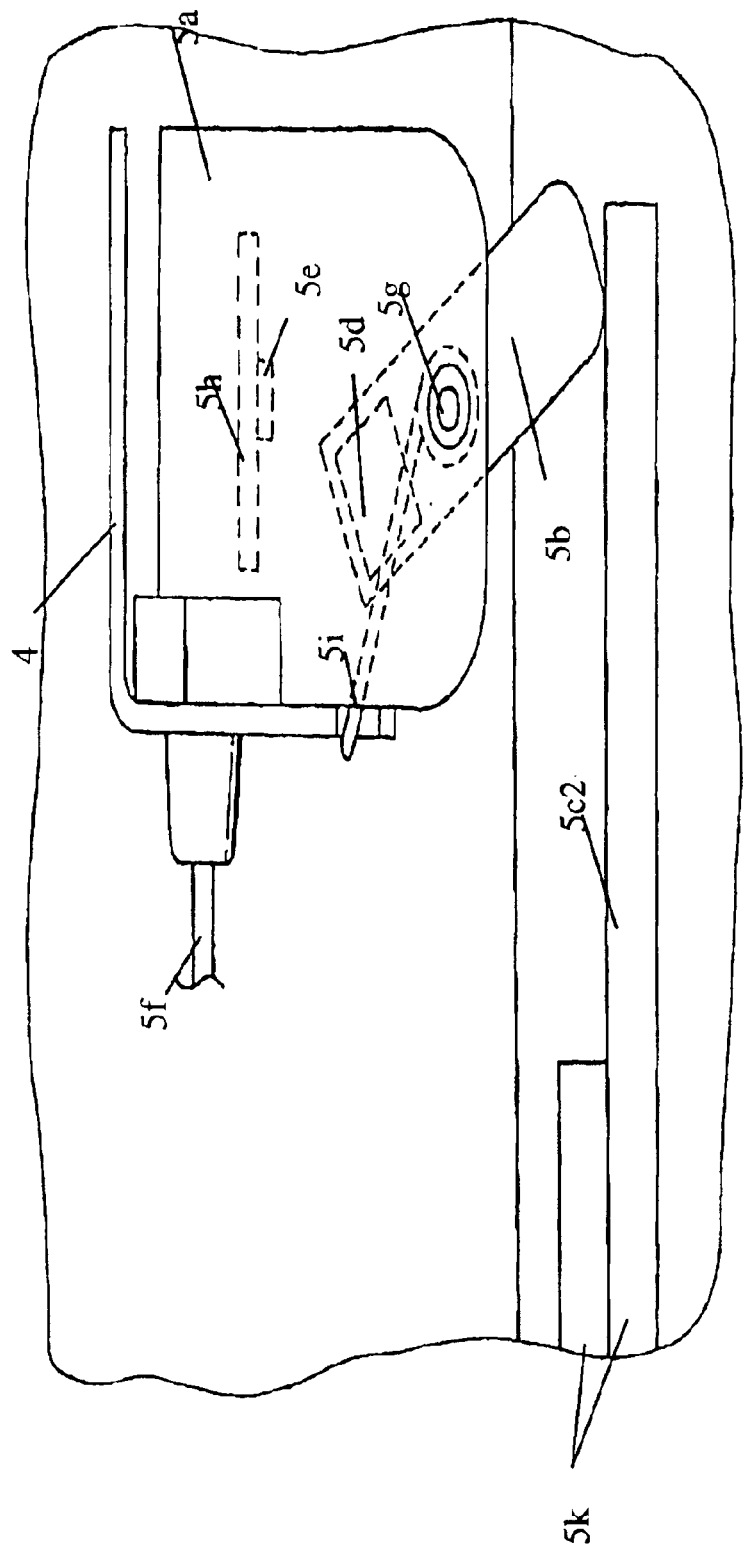
FIG. 15 is a plan view of the double pin contact plate member 5c of FIG. 14 rotating the position detecting mechanism into its "Semi-OFF" position.
Figure 16:
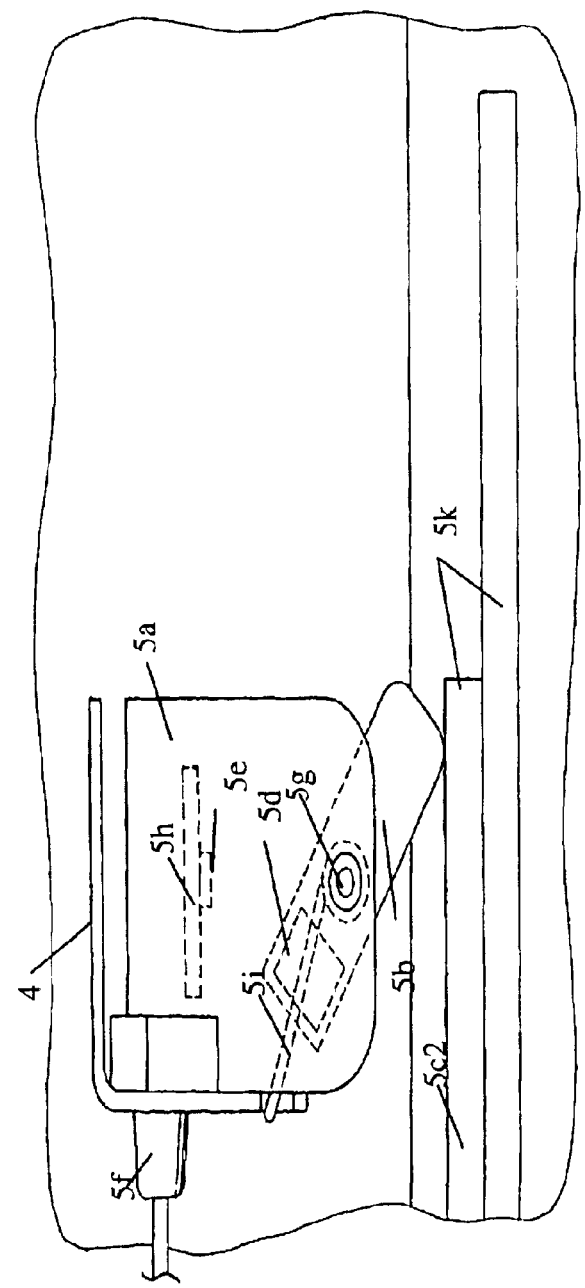
FIG. 16 is a plan view of the double pin contact plate member 5c of FIG. 14 rotating the position detecting mechanism into its "ON" position.

The contact plate member 5c may comprise a number of pin members 5k arranged close to one another on the upper rail body 3 (not shown) or lower rail body 2 (as illustrated in FIGS. 14–16) instead of a plate material (as illustrated in FIGS. 2–5). The lower rail body 2, upper rail body 3, stay device 4, and sensor position device 5 (and its assembly) are substantially identical to those discussed above, and therefore the same reference numbers are used in FIGS. 14–16 to describe such part and assemblies. As illustrated in FIGS. 14–16 double pin contact pin member 5c provides a double-step configuration with a middle "Semi-OFF" range between the "ON" range and the "FF" range similar to the contact member 5c with a second step (FIG. 6b) discussed in detail above. The description of a double pin member contact plate member are for illustration purposes only and not to limit the invention in any way. The number of pins will vary depending on operational needs.

The spring member 5i may be any biasing means and can be provided on the stay device 4 or at another appropriate location.

These and other members of the present invention described in the above may be utilized in other arrangements as long as they can provide the expected and described functions of the present invention. For example, a magnet may be provided stationary and the magnetic field sensor device may be provided pivotally.

The present invention has been described according to several embodiments using the drawings that accompany the specification. It is to be understood that these embodiments may be modified or changed within the spirit and scope of the present invention. For example, the contact plate member 5c may be provided at a rearward portion of the seat rail system of the present invention instead of a forward portion as set forth in the above, in which case, the "ON" position or range is provided when the contact lever member 5b is in contact with the contact plate member 5c and the "OFF" position or range is provided when the contact lever member 5b is not in contact with the contact plate member 5c.

What is claimed is:
1. A sensor rail device for seat position detection, comprising:
   (a) an elongated upper rail body to partially and fixedly support a seat thereon;
   (b) an elongated stationary lower rail body which slidably engages and supports said upper rail body such that said upper rail body can axially slide on said lower rail body;
   (c) a position sensor device fixedly mounted on said upper rail body; and
   (d) a contact plate member having a predetermined length, which is secured to said lower rail body at a location to be contacted by said position sensor device as the position sensor device moves along said lower rail body,
   said position sensor device comprising:
      (i) a pivotal contact lever device having a magnet member which generates a magnetic field, said contact lever device contacting said contact plate member within a predetermined range along said lower rail body, angularly displacing said magnetic field; and
      (ii) a stationary magnetic field sensor device which detects angular displacement of said magnetic field, outputting seat positional data to be electronically processed into seat positional signals.

2. A sensor rail device for seat position detection, comprising:
   (a) an elongated upper rail body to partially and fixedly support a seat thereon;
   (b) an elongated stationary lower rail body which slidably engages and supports said upper rail body such that said upper rail body can axially slide on said lower rail body;
   (c) a position sensor device fixedly mounted on said lower rail body; and
   (d) a contact plate member having a predetermined length, which is secured to said upper rail body at a location to be contacted by said position sensor device as the contact plate member moves along said lower rail body,
   said position sensor device comprising;
      (i) a pivotal contact lever device having a magnet member which generates a magnetic field, said contact lever device contacting said contact plate member within a predetermined range along said upper rail body, angularly displacing said magnetic field; and
      (ii) a stationary magnetic field sensor device which detects angular displacement of said magnetic field, outputting seat positional data to be electronically processed into seat positional signals.

3. A sensor rail device according to claim 1 or 2, wherein said contact lever device is biased by biasing means toward an angular position.

4. The sensor rail device according to claim 3 further comprising:
   another elongated upper rail body to partially and fixedly support the seat thereon; and
   another elongated stationary lower rail body which slidably engages and supports said another upper rail body such that said another upper rail body can axially slide on said another lower rail body,
   which are provided in parallel with said elongated upper rail body and said elongated stationary lower rail body for fixedly supporting the seat together.

5. A sensor rail device according to claim 1 or 2, wherein said position sensor device is at least partially housed in a bracket member.

6. The sensor rail device according to claim 5 further comprising:
- another elongated upper rail body to partially and fixedly support the seat thereon; and
- another elongated stationary lower rail body which slidably engages and supports said another upper rail body such that said another upper rail body can axially slide on said another lower rail body,
- which are provided in parallel with said elongated upper rail body and said elongated stationary lower rail body for fixedly supporting the seat together.

7. A sensor rail device according to claim 1 or 2, wherein said contact plate member comprises a plurality of pins.

8. The sensor rail device according to claim 7 further comprising:
- another elongated upper rail body to partially and fixedly support the seat thereon; and
- another elongated stationary lower rail body which slidably engages and supports said another upper rail body such that said another upper rail body can axially slide on said another lower rail body,
- which are provided in parallel with said elongated upper rail body and said elongated stationary lower rail body for fixedly supporting the seat together.

9. A sensor rail device according to claim 1 or 2, wherein said contact plate member is provided in a double-step configuration.

10. The sensor rail device according to claim 9 further comprising:
- another elongated upper rail body to partially and fixedly support the seat thereon; and
- another elongated stationary lower rail body which slidably engages and supports said another upper rail body such that said another upper rail body can axially slide on said another lower rail body,
- which are provided in parallel with said elongated upper rail body and said elongated stationary lower rail body for fixedly supporting the seat together.

11. A sensor rail device according to claim 1 or 2, wherein said contact plate member is slanted.

12. The sensor rail device according to claim 11 further comprising:
- another elongated upper rail body to partially and fixedly support the seat thereon; and
- another elongated stationary lower rail body which slidably engages and supports said another upper rail body such that said another upper rail body can axially slide on said another lower rail body,
- which are provided in parallel with said elongated upper rail body and said elongated stationary lower rail body for fixedly supporting the seat together.

13. The sensor rail device according to claim 1 further comprising:
- another elongated upper rail body to partially and fixedly support the seat thereon; and
- another elongated stationary lower rail body which slidably engages and supports said another upper rail body such that said another upper rail body can axially slide on said a other lower rail body,
- which are provided in parallel with said elongated upper rail body and said elongated stationary lower rail body for fixedly supporting the seat together.

14. The sensor rail device according to claim 2 further comprising:
- another elongated upper rail body to partially and fixedly support the seat thereon; and
- another elongated stationary lower rail body which slidably engages and supports said another upper rail body such that said another upper rail body can axially slide on said another lower rail body,
- which are provided in parallel with said elongated upper rail body and said elongated stationary lower rail body for fixedly supporting the seat together.

* * * * *